No. 877,244. PATENTED JAN. 21, 1908.
E. A. SPERRY.
METHOD OF PURIFYING STANNIC CHLORID.
APPLICATION FILED JAN. 27, 1906.
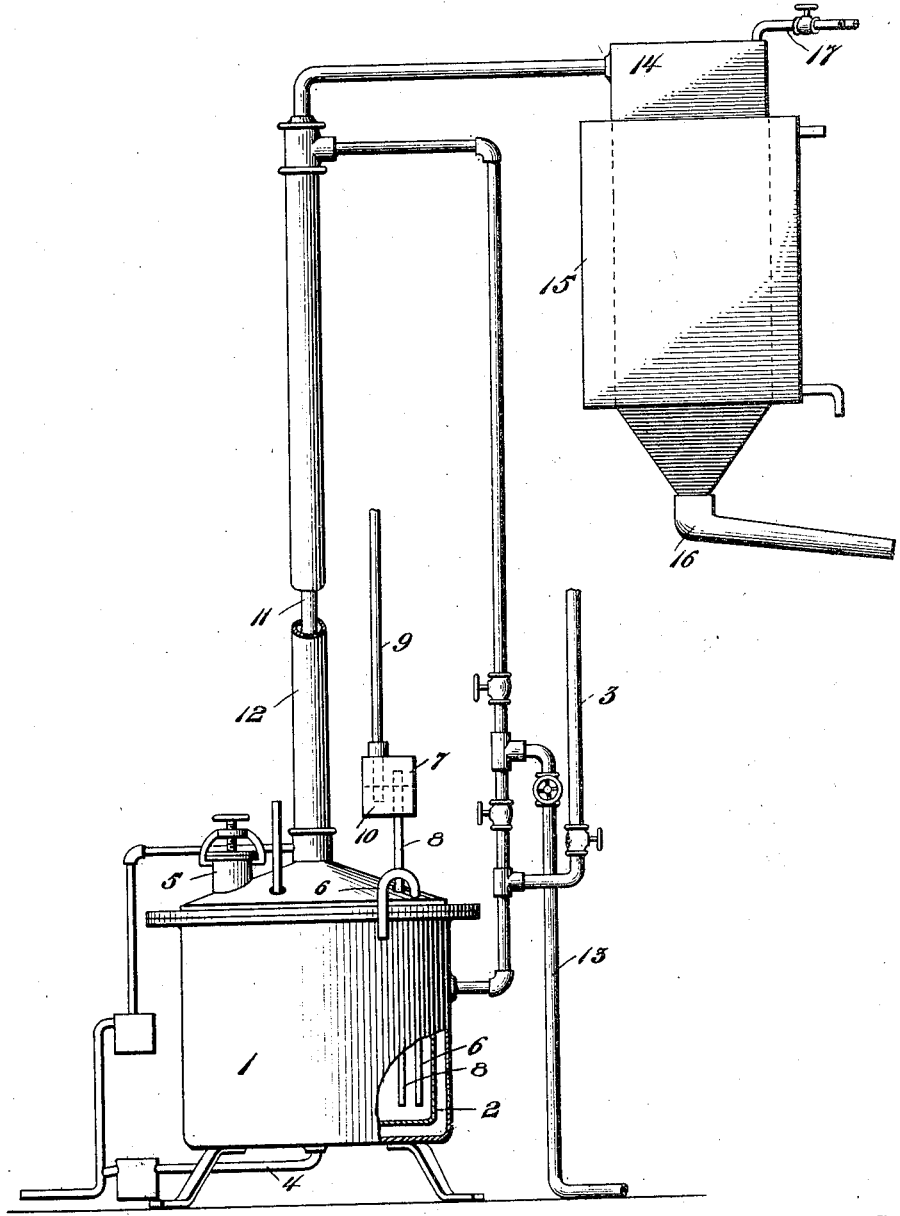
Witnesses
B. M. Offutt.
Charles H. Potter.
Inventor
Elmer A. Sperry,
By Byrnes & Townsend,
Attorneys

UNITED STATES PATENT OFFICE.

ELMER A. SPERRY, OF BROOKLYN, NEW YORK, ASSIGNOR TO CHEMICAL REDUCTION COMPANY, OF NEW YORK, N. Y., A CORPORATION OF NEW YORK.

METHOD OF PURIFYING STANNIC CHLORID.

No. 877,244.  Specification of Letters Patent.  Patented Jan. 21, 1908.

Application filed January 27, 1906. Serial No. 298,254.

*To all whom it may concern:*

Be it known that I, ELMER A. SPERRY, a citizen of the United States, residing at Brooklyn, in the county of Kings and State of New York, have invented certain new and useful Improvements in Methods of Purifying Stannic Chlorid, of which the following is a specification.

When stannic chlorid is produced by a reaction between chlorin and a material consisting wholly or in part of metallic tin, hereinafter referred to as a tin-bearing material, under conditions which involve the presence of chlorin in excess of the quantity which enters into chemical combination with the tin, the product contains uncombined chlorin the separation of which involves certain practical difficulties. The product may be anhydrous in case the reagents are free from water, or if, as is usually the case, some moisture is present the corresponding amount of hydrated stannic chlorid will be formed. This hydrated chlorid is, however, liquid at temperatures exceeding 80° C., is capable of dissolving chlorin, sublimes freely in a current of chlorin or stannic chlorid vapor, and acts in general in a manner closely analogous to the anhydrous chlorid. The term "stannic chlorid" is employed herein as indicating either the anhydrous or hydrated salt or any mixture of these.

For a full understanding of my invention reference is made to the accompanying drawings showing in side elevation an apparatus capable of carrying out my method.

1 represents a still of any preferred construction, illustrated as a cylindrical vessel having a jacket 2 with steam and drip connections 3, 4, a charging aperture 5 having a suitable closure, and a draw-off tube 6, the latter extending to a point near the bottom of the vessel. The lining 2 of the still may be of sheet lead or other light construction, in which case provision is made for equalizing the pressure; this is conveniently effected by a pressure regulator comprising a chamber 7, a pipe 8 extending from a point above the bottom thereof to a point near the bottom of the still, and a pipe 9 extending upwardly from a point within the chamber below the upper end of the pipe 8. The lower open end of the pipe 9 is sealed, preferably by an anhydrous liquid as stannic chlorid or strong sulfuric acid, indicated at 10. When the vapor pressure in the still 1 is above that of the atmosphere the liquid 10 will stand at a corresponding level in the tube 9; when, however, by reason of condensation in the still the vapor pressure falls, air is freely admitted to the interior through the liquid 10, thereby avoiding the possibility of a collapse or rupture of the still lining.

The vapor pipe 11 extends upwardly to a considerable height and is provided with a jacket 12, to which either steam or cold water may be admitted, the steam connection being indicated at 3 and the cold water connection at 13. The vapor pipe 11 leads to a condenser 14 having a water jacket 15 and a draw-off 16. A vapor pipe 17 leads from the condenser preferably to a reaction vessel in which chlorin may be caused to react upon a tin-bearing material.

In the operation of the apparatus shown the still is supplied with stannic chlorid containing chlorin and heat is applied to expel the chlorin together with such proportion of stannic chlorid as may be carried by it. The liquid in the still is preferably brought rapidly nearly or quite to the boiling point. The vapor pipe 11 is cooled by means of water admitted through pipe 13 and acts as a reflux condenser to return to the body of liquid in the still 1 a considerable proportion of the vaporized stannic chlorid. The expelled chlorin passes through the condenser 14 and pipe 17 to a reaction vessel where it is combined with tin as above described. When the liquid in still 1 is fully freed from chlorin the supply of cold water to the jacket 12 is cut off, and steam is admitted thereto through pipe 3; thereupon the pipe 11 ceases to act as a reflux condenser, but serves as a heater for the stannic chlorid vapors which are conveyed to the condenser 14 and therein condensed, the purified liquid chlorid being drawn off at 16. In case it should be unnecessary to distil the entire body of chlorin from liquid in the vessel 1, it may be readily withdrawn therefrom through draw-off 6, by means of air pressure applied through the pipe 9.

When anhydrous stannic chlorid containing free chlorin is heated, both chlorin and anhydrous chlorid are driven off, the proportion of chlorin in the vapors gradually decreasing as the heating is continued: if these mixed vapors be cooled the stannic chlorid is partially but not completely condensed, some stannic chlorid vapors always passing over with the chlorin. The expulsion of the chlorin may be accomplished by a gradual increase of temperature, but this method is found in practice to require relatively large apparatus and to involve the re-handling of a quantity of the stannic chlorid which may be several percent. of the quantity in the still, the reason being that the heating is somewhat prolonged, and during the entire period the uncondensed vapors of stannic chlorid are returning with the chlorin to the apparatus for producing the impure chlorid. According to the present invention the stannic chlorid containing free chlorin is heated to such temperature that the chlorin is very rapidly expelled, the preferred temperature being nearly or quite at the boiling point of the chlorinated liquid. Under these conditions stannic chlorid is freely vaporized, the vapors are condensed as far as possible by efficient cooling means, and the condensed liquid is returned to the still. Under these conditions of operation it is found that the escape of uncondensed stannic chlorid, instead of being increased by the use of a higher temperature is actually decreased, the escape of stannic chlorid as vapor being in fact reduced nearly in proportion to the reduction in the time of treatment. The improvement results therefore not only in an important saving of time, but in a larger immediate recovery of the purified chlorid.

I claim:

1. In a method of purifying stannic chlorid from chlorin, the improvement which consists in heating the liquid to expel chlorin and stannic chlorid, and cooling the vapors to separate stannic chlorid therefrom.

2. In a method of purifying stannic chlorid from chlorin, the improvement which consists in heating the liquid to expel chlorin and stannic chlorid, cooling the vapors to separate stannic chlorid therefrom, and returning the separated stannic chlorid to the body of the liquid.

3. In a method of purifying stannic chlorid from chlorin, the improvement which consists in heating the liquid substantially to boiling, thereby expelling chlorin and stannic chlorid, cooling the vapors to separate stannic chlorid, returning the separated stannic chlorid to the body of liquid, and continuing the operation until the chlorin is substantially expelled from the body of stannic chlorid.

4. The method of purifying stannic chlorid which consists in heating the liquid to expel chlorin and stannic chlorid, cooling the vapors to separate stannic chlorid therefrom, then distilling the chlorin-free stannic chlorid, and finally condensing the same.

5. In a method of purifying stannic chlorid from chlorin, the improvement which consists in expelling chlorin from the liquid, separating stannic chlorid from the gaseous chlorin, returning the separated stannic chlorid to the body of the liquid, and continuing the operation until the chlorin is substantially expelled from the body of stannic chlorid.

In testimony whereof, I affix my signature in presence of two witnesses.

ELMER A. SPERRY.

Witnesses:
L. A. WELLES,
JOHN A. FRY.